United States Patent [19]
Nel et al.

[11] Patent Number: 5,286,838
[45] Date of Patent: Feb. 15, 1994

[54] THERMOTROPIC LIQUID CRYSTALLINE POLYAMIDE

[75] Inventors: Jan G. Nel, Cumming, Ga.; Gert Boven, Arnhem, Netherlands

[73] Assignee: Akzo N.V., Arnhem, Netherlands

[21] Appl. No.: 975,177

[22] Filed: Nov. 12, 1992

[51] Int. Cl.$^5$ .............................................. C08G 69/12
[52] U.S. Cl. .................................. 528/331; 525/432; 528/310; 528/324; 528/329.1; 528/342; 528/347
[58] Field of Search ............ 528/331, 342, 310, 329.1, 528/347, 324; 525/432

[56] References Cited

U.S. PATENT DOCUMENTS

| | | | |
|---|---|---|---|
| 3,813,362 | 5/1974 | Coscia et al. | 528/342 |
| 5,004,323 | 4/1991 | West | 350/346 |
| 5,070,155 | 12/1991 | Liu et al. | 525/432 |

OTHER PUBLICATIONS

M. Takayanagi et al., "Polymer Composites of Rigid and Flexible Molecules: System of Wholly Aromatic and Aliphatic Polyamides", J. Macromol. Sci. Phys., B17(4), 591–615 (1980).

A. C. Griffin et al., "Mesogenic Polymers, 5 Thermotropic Polyamide Liquid Crystals and Analogous Small Molecule Diamides", Mol. Crystl. Liq. Cryst. vol. 82 (Letters) pp. 145–150 (1982).

H. Ringsdorf et al., "Synthesis, Structure and Phase Behaviour of Liquid-Crystalline Rigid-Rod Polyesters and Polyamides with Disc-Like Mesogens in the Main Chain", Makromol. Chem. 188, 1431–1445 (1987).

R. A. Gaudiana et al., "Molecular Factors Affecting Solubility in Rigid-Rod Polyamides", Journal of Polymer Science, Part A:Polymer Chemistry, vol. 25, 1249–1271 (1987).

J. M. G. Cowie eta l., "Thermotropic Liquid Crystalline Main-Chain Polyamides Containing Diaza-18-Crown-6-Ether Units", British Polymer Journal, vol. 20, No. 6, pp. 515–519 (1988).

M. Schnucki et al., "Strictly Alternating Polyamides with Stiff and Flexible Chain Segments: Effects on Thermotropic Liquid Crystallinity of the Introduction of an Ethylene Unit Into the Mesogenic Group", Makromol. Chem. 190, 1303–1308 (1989).

T. Uryu et al. "Thermotropic Liquid-Crystalline Copoly(ester amides and copolyamides containing a Flexible Spacer in the Main Chain", Polymer Journal, vol. 21, No. 12, pp. 977–986 (1989).

Primary Examiner—Harold D. Anderson
Attorney, Agent, or Firm—Richard P. Fennelly; Louis A. Morris

[57] ABSTRACT

Thermotropic liquid crystalline copolyamides comprise: (a) a thermoplastic, aliphatic polyamide, such as nylon-6,6; and (b) a mesogen comprising an amide-linked aromatic group segment which is not completely para-linked (namely, is substantially ortho- or meta-linked or a mixture of ortho- and meta-linked) by an amide linkage to an alkylene amide group contained in the mesogen.

19 Claims, No Drawings

THERMOTROPIC LIQUID CRYSTALLINE POLYAMIDE

BACKGROUND OF THE INVENTION

The discovery of lyotropic fully aromatic polyaramides, as described in U.S. Pat. No. 3,671,542, has generated a great deal of interest in ultrahigh strength, high modulus fibers. Polyaramides have been commercialized under the trademarks TWARON, by Akzo Fibers, and KEVLAR, by DuPont.

After the discovery of the aforementioned polyaramides, extensive research began to find other polymers, such as polyamides and polyesters, which could be melt processed. While a variety of thermotropic liquid crystalline polyesters were developed as a result of such research, only very few polyamide compositions are known which are thermotropic liquid crystalline and display melting points prior to decomposition.

Takayanagi et al., in J. Macromol. Sci.-Phys., B17(4), 591–615 (1980), teach certain lyotropic wholly aromatic polyamides, such as poly(p-phenylene terephthalamide), poly-p-benzamide and their block copolymers with blocks of nylon-6 or nylon-6,6. These materials were indicated as being sparingly useful for blending with a matrix of nylon-6 or nylon-6,6.

H. Ringsdorf et al., in Makromol. Chem. 188, 1431–1445 (1987), describe aromatic polyamides with disc-like mesogens in the main chain which can be prepared from tetra-substituted hydroquinones and derivatives of 1,4-phenylenediamine.

J. M. G. Cowrie et al., in British Polymer Journal 20 (1988) 515–519, describe thermotropic liquid crystalline main chain polyamides containing diazo-18-crown ether units, and, in Polymer, 29 (1988) 1128 and following, describes analogous work using a cyclooctyl ring as a flexible spacer. The latter spacer was useful in promoting a liquid crystalline phase, whereas the former spacer was not.

More recently, U.S. Pat. No. 5,070,155 describes semiaromatic copolyamides and copolyester-amides formed by reaction of (a) an aliphatic polyamide, (b) an aromatic aminoacid and/or an aromatic hydroxy acid, and (c) a stoichiometrically equivalent mixture of a diacid selected from the group consisting of the aliphatic diacids containing from 6 to 10 carbon atoms and terephthalic acid and 4,4'-dihydroxy-biphenyl. Thus, this patent document exclusively teaches the use of para-substituted aromatic reagents.

Certain examples also exist in the literature of thermotropic, liquid crystalline poly(ether-amide) compositions, as contrasted to thermotropic liquid crystalline copolyamide compositions: A. C. Griffin et al., Mol. Cryst. Liq. Cryst. Vol. 82 (Letters), pp. 145–150 (1982); M. Schmuki et al., Makromol. Chem. 190, 1303–1308 (1989); and T. Uryu et al., Polymer Journal, Vol. 21, pp. 977–986 (1989).

SUMMARY OF THE INVENTION

The present invention relates to a thermotropic liquid crystalline copolyamide comprising: (a) a thermoplastic, aliphatic polyamide; and (b) mesogen comprising an amide-linked aromatic group segment which is not completely para-linked by an amide linkage to an alkylene amide group contained in the mesogen. The polyamide (a) can be nylon-6, nylon-6,6 or nylon-4,6, for example. The mesogen unit predominantly has either meta- or ortho-linking (or a mixture of meta- and ortho-linking) between the mesogen segment containing the aromatic groups and the alkylene amide group in that mesogen unit.

DETAILED DESCRIPTION OF THE INVENTION

The person in the art can broadly select conventional polyamide units for use herein. A representative listing can be found in U.S. Pat. No. 5,102,935 at Col. 22, lines 18–68, which is incorporated herein by reference for such disclosure. Thermoplastic, aliphatic polyamides, for example, can be selected for use if desired. Such polyamides have the general formula $-[N(H)-(CH_2)_x-N(H)-C(O)-(CH_2)_y-C(O)-]$, where x and y are integers and can vary from about 1 to about 12. One representative polyamide of this type is nylon-6,6 where x is 6 and y is 4. Other known units which can be used are nylon-6 and nylon-4,6.

The mesogen unit (b) contained in the copolyamides of the present invention contains a flexible alkylene group containing portion and a more mesogenic segment which is formed by amide-linked $(-N(H)-C(O)-)$ aromatic groups. The point of attachment of the more flexible alkylene amide group spacer unit to the aromatic ring segment most proximate to it is substantially non-para, namely substantially either ortho or meta or a mixture of ortho and meta. The mesogen unit, in its broadest embodiment, which forms one essential portion of the copolyamides of the present invention comprises an appropriate mesogen unit which comprises moieties derived from an aliphatic diamine, such as hexamethylene diamine, a non-para aminobenzoic acid (or derivative), such as meta-aminobenzoic acid or ortho-aminobenzoic acid or a mixture of such non-para aminobenzoic, and an aromatic dicarboxylic acid (or derivative), such as terephthalic acid, 2,6-naphthyldicarboxylic acid, or 4,4'-dibenzoic acid.

The mesogen unit has the following preferred formula:

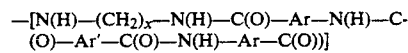

where Ar can be the same or different and represents ortho- or meta-bonded phenylene or mixtures of ortho- and meta-bonded phenylene, Ar' represents para-bonded phenylene, and x is an integer of from about 1 to about 12.

In the above mesogen unit, the following structure is the alkylene amide group (including the amide linkage to the right):

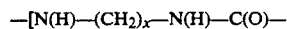

In the above mesogen unit, the following structure is the amide-linked aromatic group segment:

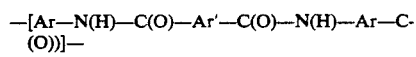

with Ar, Ar', and x in each unit as previously described. A relatively small amount of para-bonded phenylene is deemed tolerable in the compositions of the present invention as long as the amount present is not so high as to cause decomposition of the resulting copolyamides prior to melting.

The thermotropic liquid crystalline polyamide compositions of the present invention can be advantageously prepared by synthesis of the mesogen moiety which is present as one component in the mesogenic unit along with the aliphatic diamine-derived unit which functions as a flexible spacer in the mesogen unit. In the case of the preferred structures set forth above, the reaction of slightly more than two moles of aminobenzoic acid (either meta- or ortho- or combinations thereof as earlier described) with one mole of terephthaloyl chloride in an appropriate solvent (e.g., tetramethylene sulfone) with an acid acceptor, such as pyridine, will yield a reaction mixture containing a major portion of the mesogen (e.g., 3,3'[1,4-phenylenebis(carbonyl-imino]bis-benzoic acid). The reaction mixture containing this product, along with a minor portion of 3,4'-(carbonylimino)bis-benzoic acid by-product, can be added to water to precipitate the desired product.

The mesogen moiety, whose synthesis is described above, can then be used to form the desired thermotropic copolyamide compositions of this invention. The synthesis is achieved by reaction of: (a) the monomers for the thermoplastic, aliphatic polyamide component, namely an aliphatic diamine, such as hexamethylene diamine, and aliphatic diacid, such as butylene dicarboxylic acid; with (b) the monomers for the mesogen, namely the mesogen unit previously described and an aliphatic diamine, such as hexamethylene diamine, which provides a flexible spacer in the mesogen unit of the copolyamide.

The thermotropic polyamide compositions of the present invention are capable of being spun into oriented fibers as shown in Example 9, below. If the person of ordinary skill in the art wishes to increase the molecular weight of the polyamides of the present invention, they can post-condense the polyamide by further heating as illustrated in Example 10, below.

The copolyamides of the present invention can be used as an additive to flexible coil polymers such as polyamides, polyesters, and polycarbonates to form blends having improved strength (e.g., increased tenacity, improved dimensional stability, and/or increased modulus) for use as a molding compound to make shaped articles or an extrudable composition for fiber spinning.

The present invention is further understood by reference to the Examples which follow.

EXAMPLE 1

This Example illustrates preparation of the monomers used in Example 2.

Nylon-6,6 salts were first prepared as follows. Hexamethylenediamine (10 gm) and adipic acid (12.58 gm) were added together in a conical flask containing 60 ml of 100% ethanol and 10 ml water. The solution was heated for one hour at 70° C. with stirring. The nylon-6,6 salt crystallized upon cooling to 0° C., and the supernatant was decanted. The salt was recrystallized from a 6:1 ethanol:water mixture and dried for three hours at 80° C. in a vacuum oven.

The mesogen 3,3'-[1,4-phenylenebis(carbonyl-imino)]bis-benzoic acid was prepared using 3-aminobenzoic acid and terephthaloyl chloride. A 2.5:1 ratio of 3-aminobenzoic acid (58.30 gm) and terephthaloyl chloride (98.45 gm) were added together in 1000 gm of tetramethylene sulfone (sulpholane) solvent. A four molar excess of pyridine (86 ml) was added as an acid scavenger. Following stirring for twenty-four hours, the product was precipitated in water, was filtered, and was vacuum dried at 120° C. Elemental analysis was as follows when various solvents were used:

|  | C | H | N |  |
|---|---|---|---|---|
|  | 65.35 | 3.99 | 6.93 | Calc. |
| Solvent |  |  |  |  |
| Benzene | 64.53 | 4.11 | 7.19 | Found |
| NMP | 62.95 | 3.90 | 7.10 | Found |
| Ether | 63.27 | 4.03 | 6.06 | Found |
| DMF | 64.41 | 4.00 | 6.94 | Found |
| Sulpholane/DMF | 64.84 | 4.09 | 7.03 | Found |
| Sulpholane | 65.15 | 4.07 | 7.18 | Found |

Hexamethylenediamine/3,3'-[1,4-phenylenebis(carbonylimino)bis-benzoic acid salt was formed by combining 2.87 gm of the diamine with 10 gm of the diacid in a 6:1 mixture of ethanol and water. The suspension was heated to 70° C. and stirred for three hours. After cooling to room temperature, the salt was filtered and dried at 80° C. in a vacuum oven.

EXAMPLE 2

This illustrates preparation of a series of polymers containing varying weight ratios of the mesogenic unit.

A 300 ml Parr high pressure reactor, equipped with a stirrer, internal thermocouple, pressure gauge and vacuum outlet was used. A typical reaction proceeded as follows.

A polymer containing 30 wt % of mesogen was prepared by combining 30 gm of 3,3'-[1,4-phenylenebis(-carbonyl-imino)bis-benzoic acid/hexamethylenediamine salt and 70 gm of nylon-6,6 salt in the reactor. Distilled water (45 wt %) was added, and the reactor sealed. The atmosphere in the reactor was replaced with a nitrogen atmosphere after which it was heated to 200° C. over a 45 minute period. The reaction was allowed to continue at 200° C. and 200 psi for one and one half hours after which the temperature was increased to 240° C. and held at a pressure of 200–300 psi. After one and one half hours at 240° C., the pressure was reduced from 260 psi and a vacuum was applied for an additional six hours. The reactor was allowed to cool to room temperature while a stream of nitrogen was passed through it.

Elemental analysis of a series of polymers containing from 10% to 100% mesogen were as follows:

| Wt % Mesogen | C | H | N |  |
|---|---|---|---|---|
| 10 | 64.29 | 9.34 | 12.31 | Calc. |
|  | 64.04 | 9.93 | 12.06 | Found |
| 20 | 64.86 | 8.94 | 12.22 | Calc. |
|  | 64.79 | 8.65 | 12.27 | Found |
| 30 | 65.43 | 8.55 | 12.14 | Calc. |
|  | 64.32 | 9.18 | 11.77 | Found |
| 40 | 66.00 | 8.15 | 12.06 | Calc. |
|  | 65.78 | 8.41 | 11.95 | Found |
| 50 | 66.57 | 7.77 | 11.99 | Calc. |
|  | 65.23 | 8.35 | 11.75 | Found |
| 60 | 67.14 | 7.36 | 11.89 | Calc. |
|  | 67.25 | 7.47 | 11.83 | Found |
| 80 | 68.28 | 6.58 | 11.74 | Calc. |
|  | 67.85 | 6.74 | 11.51 | Found |
| 100 | 69.42 | 5.79 | 11.57 | Calc. |
|  | 68.32 | 5.95 | 11.21 | Found |

The inherent viscosities of these samples (at 35° C. in 96% sulfuric acid were as follows:

| % Mesogen | Inherent Visc. |
|---|---|
| 10 | 0.48 |
| 20 | 0.81 |
| 30 | 0.52 |
| 40 | 0.72 |
| 40 | 0.49 |
| 50 | 0.39 |
| 60 | 0.76 |
| 80 | 0.34 |
| 80 | 0.71 |
| 100 | 0.13 |

The samples containing 30% and less of the mesogen exhibited properties similar to nylon-6,6 whereas those of 40% mesogen and higher showed liquid crystal properties (nematic).

The $T_g$ (glass transition temperature), $T_c$ (crystallization temperature), and $T_m$ (melting temperature) of certain of these products was also determined:

| Mesogen wt % | $T_g$ | $T_c$ | $T_m$ |
|---|---|---|---|
| | (in degrees Centigrade) | | |
| 0 | 56 | 232 | 265 |
| 10 | 70 | 212 | 251 |
| 20 | 78 | 195 | 238 |
| 30 | 84 | 169 | 219 |
| 40 | 91 | 159 | 217 |
| 50 | 118 | * | * |
| 60 | 122 | * | * |
| 80 | 131 | * | * |
| 100 | 154 | * | * |

* = amorphous (i.e., no melting or crystallization was observed).

EXAMPLE 3

This sets forth the synthesis of a thermotropic liquid crystalline polyamide containing nylon-6,6 as the flexible spacer and 1,6-diaminobutane 2,2'-[1,4-phenylenebis(carbonyl-imino)]bis-benzoic acid as the mesogen. Polymer samples containing 20 and 40 wt % of the mesogen were prepared with bulk melt condensation polymerization techniques being used to synthesize 100 gm polyamide samples.

The following detailed procedure relates to preparation of the polymer containing 40 wt % mesogen: The polyamide 6,6 salt (200 batch) was first prepared in a 6:1 ethanol/water mixture (300/50 ml), was filtered and was dried at 100° C. for twelve hours. The mesogen, 2,2'-[1,4-phenylenebis(carbonyl-imino)]bis-benzoic acid, was prepared in the same general fashion as described in Example 1, above.

Polyamide 6,6 salt (60 gm) and the mesogen, 1,6-diaminobutane 2,2'-[1,4-phenylenebis(carbonyl-imino)]-bis-benzoic acid (40 gm), were added together in a 300 ml Parr reactor with 38 ml of water. The reactor was then sealed, and the atmosphere was replaced with nitrogen. The following temperature, pressure and time profile was used to prepare these polyamides: 90° C., nitrogen flush at 25 PSI for thirty minutes; 200°-215° C., 260 PSI for one hundred and twenty minutes; 220°-240° C., reducing pressure to 25 PSI over a one hundred and twenty minute period; and 260° C., argon purge at 25 PSI for one hundred and eighty minutes. The copolyamide was then extruded through a drain plug and was quenched in liquid nitrogen to prevent decomposition. Carbon-13 NMR spectroscopy was used to confirm the chemical structure of all samples.

A sample containing 20 wt % of mesogen was also prepared and had a similar melting temperature (250° C.) as compared to polyamide 6,6 (265° C.) and also a reduced crystallization temperature of 225° C. It showed no signs of liquid crystallinity and had a Tg of 75° C.

EXAMPLE 4

This Example illustrates the process used to form blends of nylon-6,6 and two of the thermotropic liquid crystal polyamides of the present invention.

Blends of 90 wt % nylon-6,6 and 10 wt % of polyamide containing 40 wt % of either the meta-mesogen of Example 1 or the ortho-mesogen of Example 3 were prepared. Initially, dried, powder samples of each component of the blends was tumble mixed together at room temperature for no less than two days. Then, the blended powders were hot pressed at 280° C. for two minutes, followed by grinding, and then drying at 140° C. for two days.

Spinning of fibers from the blends was performed on a RANDCASTLE microextruder with a die temperature for the blend of 290° C. as compared to a temperature of 310° C. for the nylon-6,6 not containing the liquid crystalline polyamide. The residence time of the sample was 3-5 minutes and the take up speed of the resulting fibers was 100 meters/minute.

Cold drawing of fibers was practiced at a temperature of 80° C. at draw ratios of 3.5 to 5.0. Hot drawing of the nylon-6,6 was performed at 185° C. at draw ratios of 1.1 to 1.45 whereas the blends were drawn at 210° C. at draw ratios of 1.1 to 1.6.

Tensile testing was performed according to the ASTM Test D 2256-88, with some modifications, i.e. in all cases the test speed was 100%/min and in one case the test length was 50 mm. The various conditions are described below;

| Test Method | A | B |
|---|---|---|
| Temperature (°C.) | 21 | 21 |
| Relative humidity (%) | 50 | 65 |
| Gage length (mm) | 50 | 100 |
| Test speed (mm/min) | 50 | 100 |
| Dimensions measured by | diameter | denier |

The modulus and tensile strength measured using method A were converted into mN/tex using 116 gr.cm$^{-3}$ for the density of the nylon fibers. The mechanical properties of commercial nylon 6,6 fibers, measured in both ways, were as follows:

| Test Method | A | B |
|---|---|---|
| Initial modulus (N/tex) | 4.7 | 3.5 |
| Breaking tenacity (mN/tex) | 900 | 750 |
| Elongation at break (%) | 21 | 18 |

EXAMPLE 5

This descries the tensile property results obtained for the blend described in Example 4 containing the meta-mesogen when cold drawn at 4.0 and hot drawn at 1.4.

The tensile properties were as follows using the conditions in Example 4.

| Conditions A (Gage Length = 5 cm): | |
|---|---|
| Emod | = 7.3, 6.3 and 7.4 N/tex |
| Strength | = 770, 750 and 860 mN/tex |

-continued

| | |
|---|---|
| EAB | = 15%, 18% and 17% |
| Conditions B (Gage Length = 10 cm): | |
| Emod | = 5.2 N/tex |
| Strength | = 630 mN/tex |
| EAB | = 14% |

EXAMPLE 6

Mechanical properties of the blend tested under conditions A in Example 5 at various overall draw ratios (cold draw ratio=4.0 plus variable hot draw ratio) is given below.

Shrinkage was measured by equilibrating monofilaments at 70° F. (21° C.) and 50% relative humidity for over sixteen hours. The length (L1) was then measured after one minute under a load of 5 mN/tex. The monofilament was then placed in a 190° C. oven for fifteen minutes to freely shrink the filament. The filament was allowed to equilibrate and its length (L2) was measured. Shrinkage was calculated as:

$$\frac{L1 - L2}{L2} \times 100\%.$$

The results obtained were as follows:

| | OVERALL DRAW RATIO | | |
|---|---|---|---|
| | 5.6 | 5.9 | 6.4 |
| Emod (GPa) | 8.4 | 9.0 | 8.9 |
| Strength (MPa) | 900 | 980 | 1020 |
| Elongation at break (%) | 15.0 | 13.0 | 11.0 |
| Shrinkage (%) | 5.8 | 6.6 | 7.4 |

EXAMPLE 7

This Example sets forth the mechanical properties for nylon-6,6, a 90/10 (w/w) blend of nylon-6,6 and the polyamide containing the meta-mesogen of Example 1, and a 90/10 (w/w) blend of nylon-6,6 and the polyamide containing the ortho-mesogen of Example 3, each of the latter two at 40% by weight mesogen. The cold draw ratio was 4.0 and the hot draw ratio was 1.4.

| | Nylon-6,6 Alone | Nylon-6,6+ Meta-Mesogen | Nylon-6,6+ Ortho-Mesogen |
|---|---|---|---|
| Emod (GPa) | 6.5 | 8.4 | 6.0 |
| Strength (MPa) | 960 | 900 | 730 |
| Elongation (%) | 15.0 | 15.0 | 24.0 |
| Shrinkage (%) | 7.8 | 5.8 | 5.7 |

EXAMPLE 8

Fibers were also prepared from a 90%/10% (w/w) blend of the same nylon-6,6 and the polyamide additive of this invention containing 40 wt % of the meta-mesogen of Example 1. The spinning temperature was 290° C., the take up speed was 100 m/min, the cold draw was done at 80° C., and the hot draw was performed at 210° C. The following data were generated with the mechanical properties being determined under condition A:

| CDR | HDR | DR | Emod (GPa) | Emod (N/tex) |
|---|---|---|---|---|
| 3.5 | 1.6 | 5.6 | 8.4 | 7.2 |
| 4 | 1.4 | 5.6 | 8.4 | 7.3 |
| 4 | 1.48 | 5.9 | 9.0 | 7.8 |
| 4 | 1.6 | 6.4 | 8.9 | 7.6 |
| 5 | 1.12 | 5.6 | 8.4 | 7.2 |
| Strength (MPa) | Tenacity (mN/tex) | Elongation (%) | Shrinkage (%) | |
| 840 | 730 | 17 | 5.3 | |
| 900 | 770 | 15 | 5.8 | |
| 980 | 840 | 13 | 6.6 | |
| 1020 | 880 | 11 | 7.4 | |
| 770 | 670 | 18 | 4.3 | |

Finally, fibers were formed using the polyamide-containing the ortho-mesogen in a similar fashion as just described for the meta-mesogen with the exception that the take up speed was 75 m/min. rather than 100 m/min. The following data was generated:

| CDR | HDR | DR | Emod (GPa) | Emod (N/tex) |
|---|---|---|---|---|
| 3.9 | 1.4 | 5.46 | 6.0 | 5.2 |
| 3.9 | 1.5 | 5.85 | 6.5 | 5.6 |
| 3.9 | 1.6 | 6.24 | 6.6 | 5.7 |
| 5.1 | 1.1 | 5.61 | 6.4 | 5.5 |
| 5.1 | 1.2 | 6.12 | 6.3 | 5.5 |
| Strength (MPa) | Tenacity (mN/tex) | Elongation (%) | Shrinkage (%) | |
| 730 | 630 | 24 | 5.7 | |
| 870 | 750 | 18 | 6.1 | |
| 920 | 790 | 16 | 5.6 | |
| 770 | 660 | 18 | 5.2 | |
| 810 | 700 | 15 | 5.8 | |

EXAMPLE 9

This Example illustrates the super-cooled fiber spinning of a thermotropic liquid crystalline polyamide containing nylon-6,6, in accordance with an embodiment of the invention.

A thermotropic liquid crystalline polyamide, poly-3,3'-[1,4-phenylenebis (carbonyl-imino)]bis-benzoic acid-co-nylon-6,6 was spun into oriented fibers at 225° C. (i.e., the super-cooled state) and at 275° C. (i.e., the molten state). Molecular orientation was verified by WAXD analysis and polarized optical microscopy for the super-cooled fiber and totally amorphous molecular structure for the other. The fiber sample spun at the lower temperature of 225° C. had both a higher modulus (3.87 GPa) and strength at break (230 GPa) than a polymer of the same chemical composition which was spun at 275° C., i.e., having a modulus 3.32 GPa and strength at break of 128 GPa.

EXAMPLE 10

This Example illustrates the use of post-condensation to increase the molecular weight of a nematic thermotropic liquid crystalline random copolyamide, made in accordance with the present invention, which contained 40 mole % nylon-6,6 and 60 mole % of 1,6-hexamethylene 3,3'-[1,4-phenylene bis(carbonyl-imino)]bis-benzoic acid. The original polyamide had an inherent viscosity of 0.38 dL/g as measured in 96% sulfuric acid. A 5 gm sample of this polymer was heated at 185° C., under vacuum for forty-eight hours to post-condense it into a higher molecular weight polymer. The inherent viscosity of this sample following the post-condensation polymerization increased to 0.49 dL/g.

EXAMPLES 11-12

These Examples illustrate the synthesis of a thermotropic liquid crystalline polyamide in accordance with the present invention containing nylon-4,6 as the flexible spacer and 1,4-diaminobutane 3,3'-[1,4-phenylenebis(carbonyl-imino)]bis-benzoic acid as the mesogen. Polymer samples (100 gm) containing 20 and 40 wt % of the mesogen were prepared. The 40 wt % sample was prepared as follows:

The polyamide 4,6 salt (200 gm batch) was prepared in a 6:1 ethanol/water mixture (300/50 ml) by the process described in Example 1, filtered and dried at 100° C. for twelve hours. The mesogen, 3,3'-[1,4-phenylenebis(carbonyl-imino)]bis-benzoic acid was prepared in the same fashion as described in Example 1. Polyamide 4,6 salt (60 gm) and mesogen, 1,4-diaminobutane 3,3'-[1,4-phenylenebis(carbonyl-imino)]-bis-benzoic acid, (40 gm) were added together in a 300 ml Parr reactor with 40 ml of water. The reactor was sealed, and the atmosphere replaced with nitrogen. The following temperature, pressure and time profile was used to prepare these polyamides: 90° C., nitrogen flush at 10 PSI for thirty minutes; 200° C., 260 PSI for two hours; 220°-240° C., reducing pressure to 25 PSI over a one hour period; 240° C., nitrogen purge at 25 PSI for one and one-half hours. The resulting copolyamide was subsequently extruded through a drain plug and quenched in liquid nitrogen to prevent decomposition. Carbon-13 NMR spectroscopy was used to confirm the chemical structure of the samples.

The sample containing 20 wt % of mesogen had a reduced melting temperature (260°-280° C.) compared to polyamide 4,6 (295° C.) and also a reduced crystallization temperature of 225° C. Polyamide m-20-4,6 showed no signs of liquid crystallinity.

The sample containing 40 wt % of mesogen was more amorphous with a large glass transition peak at 72° C., and a broad melting temperature range of 160°-220° C. The sample started flowing above 160° C., and a nematic texture was observed by polarizing optical microscope. This texture persisted up to 230° C. after which an isotropic melt was observed.

The preceding Examples have been provided for illustrative purposes only and for that reason should not be construed in a limiting sense. The scope of protection sought is set forth in the claims which follow.

We claim:

1. A thermotropic liquid crystalline copolyamide which comprises:
   (a) a thermoplastic, aliphatic polyamide; and
   (b) a mesogen, comprising an amide-linked aromatic group segment containing aromatic groups, which is other than completely para-linked by an amide linkage of the formula —NH— C(O)— to an alkylene amide group contained in the mesogen.

2. A copolyamide as claimed in claim 1 wherein the polyamide (a) is nylon-6,6.

3. A copolyamide as claimed in claim 1 wherein the aromatic groups in (b) are meta-linked.

4. A copolyamide as claimed in claim 1 wherein the aromatic groups in (b) are ortho-linked.

5. A copolyamide as claimed in claim 2 wherein the aromatic groups in (b) are meta-linked.

6. A copolyamide as claimed in claim 2 wherein the aromatic groups in (b) are ortho-linked.

7. A copolyamide as claimed in claim 1 wherein the mesogen (b) contains a moiety derived from 3,3'-[1,4-phenylene bis(carbonyl-imino)]bis-benzoic acid.

8. A copolyamide as claimed in claim 2 wherein the mesogen (b) contains a moiety derived from 3,3'-[1,4-phenylene bis(carbonyl-imino)]bis-benzoic acid.

9. A copolyamide as claimed in claim 3 wherein the mesogen (b) contains a moiety derived from 3,3'-[1,4-phenylene bis(carbonyl-imino)]bis-benzoic acid.

10. A copolyamide as claimed in claim 5 wherein the mesogen (b) contains a moiety derived from 3,3'-[1,4-phenylene bis(carbonyl-imino)]bis-benzoic acid.

11. A copolyamide as claimed in claim 1 wherein the mesogen (b) contains a moiety derived from 2,2'-[1,4-phenylene bis(carbonyl-imino)]bis-benzoic acid.

12. A copolyamide as claimed in claim 2 wherein the mesogen (b) contains a moiety derived from 2,2'-[1,4-phenylene bis(carbonyl-imino)]bis-benzoic acid.

13. A copolyamide as claimed in claim 4 wherein the mesogen (b) contains a moiety derived from 2,2'-[1,4-phenylene bis(carbonyl-imino)]bis-benzoic acid.

14. A copolyamide as claimed in claim 6 wherein the mesogen (b) contains a moiety derived from 2,2'-[1,4-phenylene bis(carbonyl-imino)]bis-benzoic acid.

15. A blend of a flexible coil polymer and the copolyamide of claim 1.

16. A blend as claimed in claim 15 wherein the flexible coil polymer is a polyamide.

17. A blend as claimed in claim 16 wherein the polyamide is nylon-6,6.

18. A blend as claimed in claim 15 wherein the copolyamide comprises an aromatic group segment which is meta-linked to the alkylene amide group in the mesogen.

19. A blend as claimed in claim 15 wherein the copolyamide comprises an aromatic group segment which is ortho-linked to the alkylene amide group in the mesogen.

* * * * *